(No Model.)  4 Sheets—Sheet 1.

C. B. PRICE.
FROGLESS SWITCH.

No. 553,934.  Patented Feb. 4, 1896.

Witnesses
Jno. G. Hinkel
J. A. Faingrim

Inventor
Charles B. Price
by Faxen Freeman
Attorneys (No Model.) 4 Sheets—Sheet 3.
C. B. PRICE.
FROGLESS SWITCH.

No. 553,934. Patented Feb. 4, 1896.

Witnesses
Inventor
Charles B. Price
by
Attorneys (No Model.)  4 Sheets—Sheet 4.
C. B. PRICE.
FROGLESS SWITCH.
No. 553,934.  Patented Feb. 4, 1896.
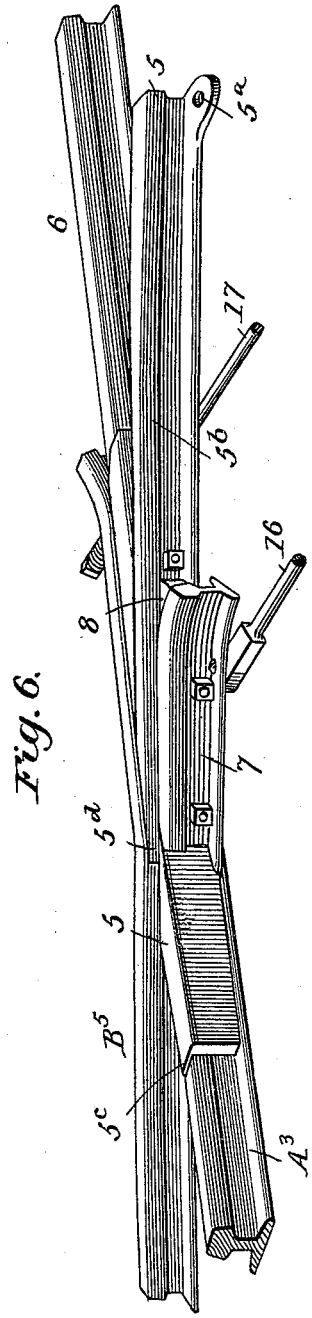
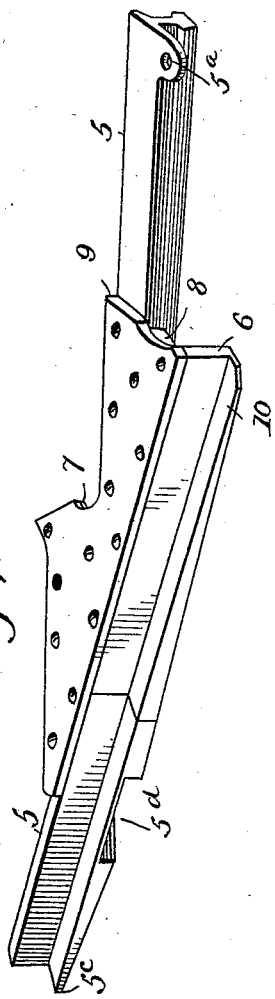

UNITED STATES PATENT OFFICE.

CHARLES B. PRICE, OF PITTSBURG, PENNSYLVANIA.

FROGLESS SWITCH.

SPECIFICATION forming part of Letters Patent No. 553,934, dated February 4, 1896.

Application filed August 15, 1895. Serial No. 559,388. (No model.)

*To all whom it may concern:*

Be it known that I, CHARLES B. PRICE, a citizen of the United States, residing at Pittsburg, in the county of Allegheny and State of Pennsylvania, have invented certain new and useful Improvements in Frogless Switches, of which the following is a specification.

My invention relates to that class of switch devices patented to me in United States Patents Nos. 398,975 and 515,361, in which there are two separated but connected movable sections—as, for instance, the movable switch-point, and another movable point or frog-section at a distance from the first; and my invention consists in the combination, with such separated sections, of locking devices arranged to be held in position by the wheels of a train, so that neither section can be shifted so long as any of the wheels of the train are between the two sections; and the invention consists further in the novel construction, arrangement, and operation of the parts hereinafter more fully described.

Figure 1:
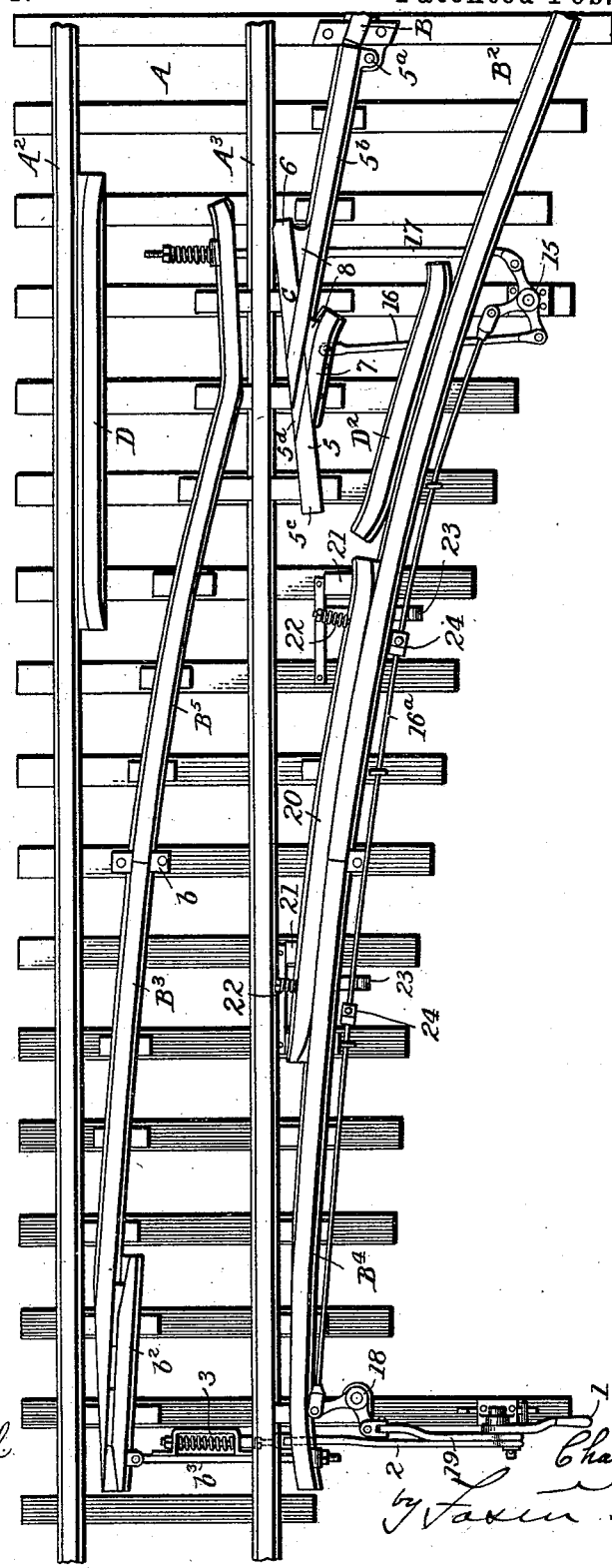
Figure 2:
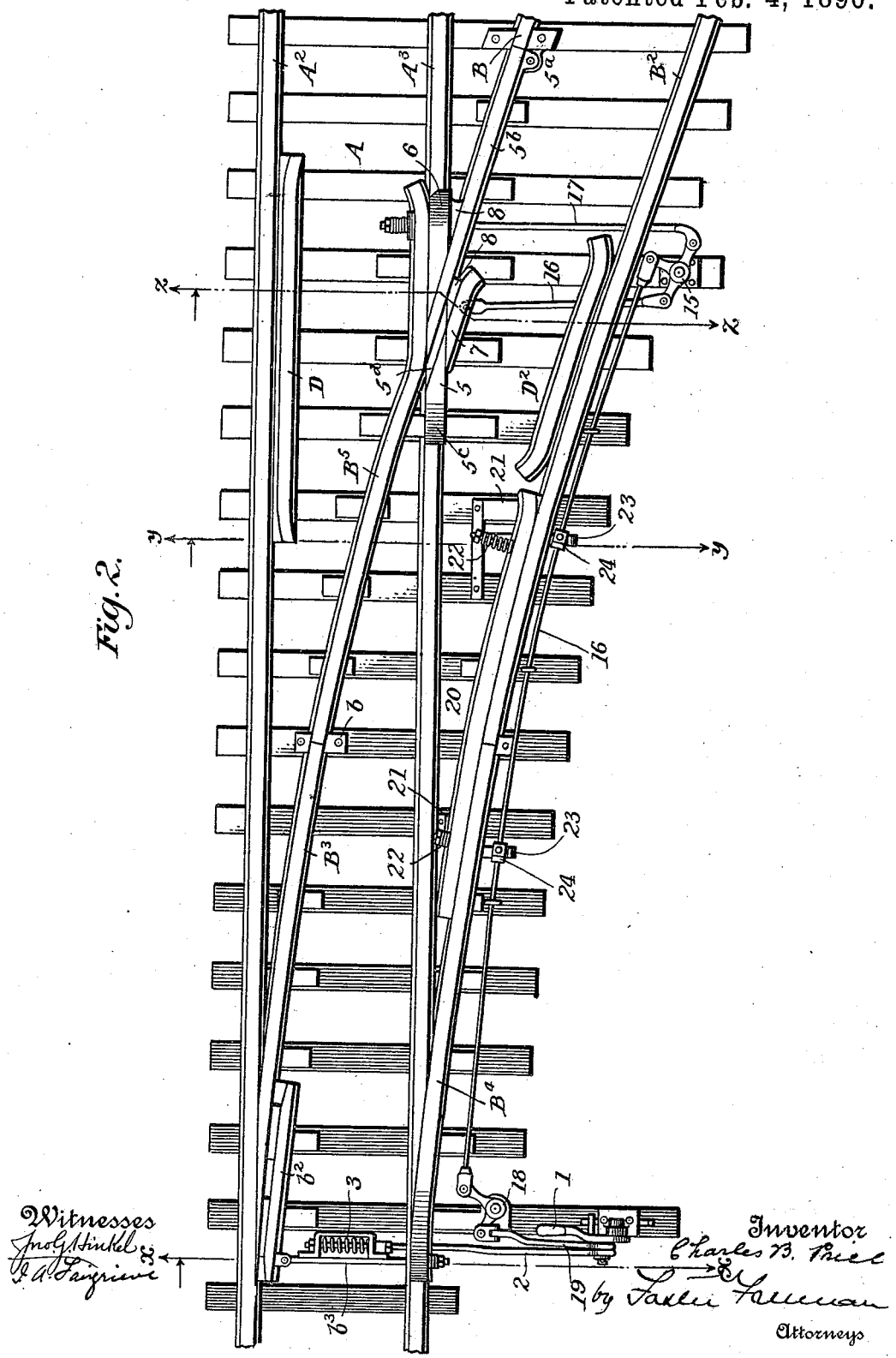
Figure 3:
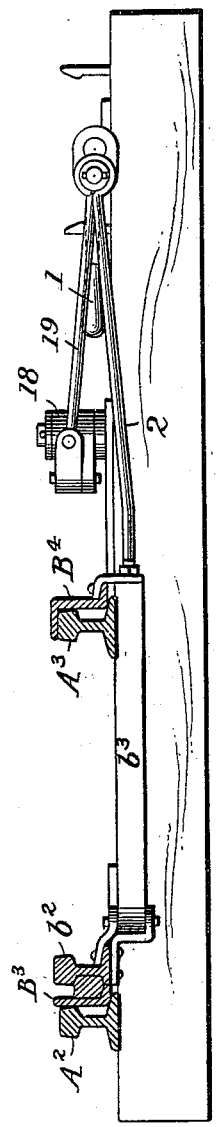
Figure 4:
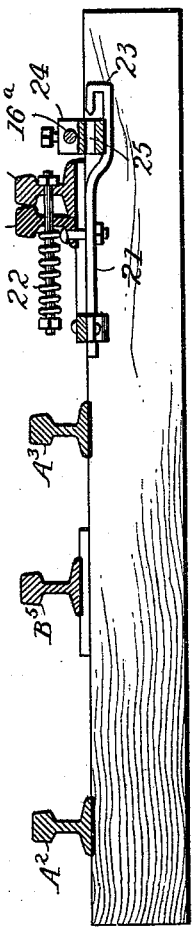
Figure 5:
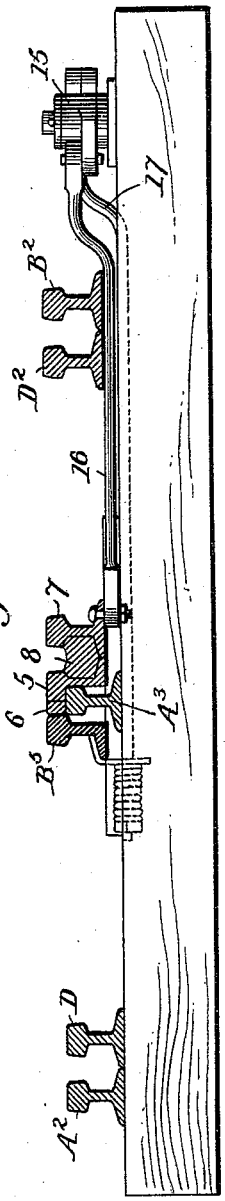

In the accompanying drawings, forming a part of this specification, and in which like letters and numerals of reference indicate corresponding parts, Figure 1 is a plan view of sufficient of a siding, junction, and switching devices to illustrate my invention. Fig. 2 is a similar view illustrating the movable section of the switch in its position on the main-line track. Fig. 3 is a section on the line $x\,x$ of Fig. 2. Fig. 4 is a similar view on the line $y\,y$ of Fig. 2. Fig. 5 is a sectional view on the line $z\,z$ of Fig. 2. Fig. 6 is a detail perspective view showing the frog in its position over the main-line track, and Fig. 7 is a detail inverted perspective view of a modification of the frog.

Referring to the drawings, A represents an unbroken main line, and $A^2$ $A^3$ indicate the rails of the main line.

B $B^2$ are the side-track rails, and $B^3$ is the leading-on rail of the side track, fixed at one end by the chair $b$ and having its other end tapered to form the point of the switch. This leading-on rail is arranged diagonally between the rails $A^2$ $A^3$ and is provided with a guard-rail $b^2$ adjacent to its point.

Connected to or forming an extension of the side-track rail $B^2$ is a movable rail-section $B^4$, arranged to lie normally on the outside of the main-line rail $A^3$ and out of contact therewith. The outer end of this rail-section $B^4$ is formed tapering and is adapted to overlap the main-line rail $A^3$ when the switch is set for the side track. The leading-on rail $B^3$ and the rail-section $B^4$ are connected by a suitable rod or frame $b^3$, so that they will move simultaneously into contact with the rails $A^2$ $A^3$, respectively, to open the side track and out of contact with said rails to close said track.

Any suitable means may be employed for moving the rails $B^3$ $B^4$, that shown consisting of a lever 1, pivotally fixed at its lower end and connected to the rod $b^3$ by means of a second lever 2, pivoted to the lever 1 at a point above its fixed pivotal point.

Instead of the above mechanism, any of the well-known forms of switch-stands may be employed for shifting the rails $B^3$ $B^4$; but the rail $B^3$ should be provided with a spring device 3, which will permit its being temporarily forced away from the main-line rail by the flange of the wheels of a train passing over the main line in the direction of the arrow, Fig. 2, when the switch is set for the side track.

Connected to or forming an extension of the leading-on rail $B^3$ is a spring guard-rail $B^5$, which is arranged to lie normally away from, but inside, the main-line rail $A^3$ when the switch is set for the main line; but when the switch is set for the siding the spring guard-rail is moved up to and against the inside of said rail $A^3$ and forms a practically unbroken continuation or connection of the tread between the leading-on rail $B^3$ and a frog C, hereinafter described. One end of this spring guard-rail is secured in the chair $b$, and said rail is adapted to be moved simultaneously with the frog-section C and the rail-section $B^3$ $B^4$ by devices which will be presently referred to. A spring device $3^a$ is connected to the guard-rail $B^5$ to permit its being forced from contact with the track by the flange of the wheels of a train passing over the main line when the switch is set for the siding.

Heretofore movable frogs such as are used in frogless switches have usually been formed by casting or forging them in a single piece. This method is expensive and the frogs are necessarily heavy. In addition to this when any portion of the frog wears away or becomes broken by reason of a defect in the casting, or from any other cause, it is extremely difficult, if not altogether impossible, to repair it, and thus it becomes useless and has to be thrown away. I obviate all of these objections by forming the frog C in two or more sections which are secured together in any suitable manner. In the present instance I have shown the frog as composed of three sections 5, 6 and 7, having filling-pieces 8 interposed between them at suitable points. These sections and filling-pieces are preferably bolted together, as shown in Fig. 6; but any other means may be employed for this purpose—as, for instance, that shown in Fig. 7, consisting of a base-plate 9, to which the sections 5 6 7 are bolted. This latter means of securing the sections is preferable in those cases where it is desirable that the frog have a perfectly smooth and unbroken bottom. From the above it will be noted that should the frog become broken or worn that section on which the break or wear takes place may be readily removed and a new section substituted.

The main section 5 of the frog is pivoted at $5^a$, and consists essentially of a body portion forming a tread $5^b$, which, when the frog is in position, forms a continuation of the side-track rail B. This tread is bent near its free end and formed with a flange $5^c$, adapted to pass over and rest upon the face of the main-line rail $A^3$. This flange gradually tapers on its upper surface toward the end of the section 5, and forms an inclined surface for the passage of the wheels of the cars, if, perchance, the train should pass over the main line when the frog is set for the siding. Secured to the main section 5, and arranged to form practically a continuation of the bent end of said section, is the section 6, provided likewise with a tapering flange 10, which passes over and rests on the main-line rail $A^3$ when the frog C is in position.

The section 5 is provided with a recess $5^d$, which extends across the bent end of said section to accommodate the flange of the car-wheels passing onto the side track. The section 7 of the frog is secured to the main section 5 and serves as a guard-rail. Guard-rails D $D^2$ are also arranged parallel to the main and side track rails adjacent to the frog C.

Any suitable devices may be employed for simultaneously moving the guard-rail section $B^5$ and the frog C, that shown consisting of a three-armed lever 15, pivoted adjacent to the side track and having its diametrically-opposite arms connected by bars 16 and 17 to the frog and guard-rail, respectively, in order that when said lever is partially rotated said frog and guard-rail will move in opposite directions. The center arm of the lever 15 is connected to one end of a rod $16^a$, extending at the side of the side track to a point adjacent to the ends of the leading-on rail $B^3$ and the movable rail-section $B^4$, where it is connected to one end of a bell-crank lever 18, which is in turn connected by means of a bar 19 to the operating-lever 1. From this it will appear that whenever the lever 1 is swung to one side or the other the leading-on rail $B^3$, movable rail-section $B^4$, frog C, and guard-rail $B^5$ are simultaneously operated.

It often happens in the use of frogless switches that the switch-tender will sometimes throw the switch and change the position both of the switch-points and of the frog-sections immediately upon the last wheels of the train passing from the main track to the siding, so that when said wheels reach the frogs they are derailed. Similar accidents are apt to happen in those switch devices where there is any considerable distance between the switch-points and other connected parts.

To obviate this difficulty, I combine with the switch-points or rails, and with the movable frogs or other movable devices distant from the switch-points, locking devices of a character adapted to lock both the switch-points and frogs so long as any of the wheels of the train are upon any portion of the track between the two movable parts or sections of the switch.

I am aware that heretofore devices for locking the movable parts of a switch have been employed, such a device being described in one of my patents, hereinbefore referred to. Such prior devices consist usually of a movable bar arranged adjacent to the rails of the side track in position to be depressed by the wheels of a train to cause it to lock the parts connected with the switch-points and with the frog against movement. This bar is usually arranged at the outside of the rail and projects above it in position to be depressed by the overhanging tread of the car-wheel, and while in operation it has proved very satisfactory its use has been attended with certain objections arising from the extreme liability of the bars becoming clogged with snow and ice. Of late, too, the treads of car-wheels have been formed much narrower than formerly and have no overhanging portion to engage and depress the locking-bar, and consequently the perfect operation of the said bar cannot be depended upon. The new form of locking device is intended to remove all of these objections, and it consists of a locking-bar 20 resting upon guides 21 at the inner side of one of the side-track rails. This bar is normally pressed into contact with the side-track rail by means of springs 22, and is adapted to be moved out of contact therewith by the flange of a car-wheel passing between it and the adjacent side-track rail. Secured to the bar 20 are devices which are adapted to interlock with devices carried by the rod $16^a$ to hold said rod against movement. Any suitable locking means may be employed for this purpose, those shown constituting a simple and efficient manner of accomplishing the purpose. These devices consist of hooked arms 23, connected at one end to the locking-bar and having their hooked ends arranged adjacent to the rod 16.

Upon this rod are blocks 24, provided with recesses 25, which are engaged by the hooks of the arms 23 when the locking-bar is moved out of contact with the side-track rail by the passage of a train from the side track to the main line, or vice versa. These blocks normally rest out of alignment with the ends of the arms 23, as shown in Fig. 1, and only when the switch is operated to open the side track are they moved into position to be engaged by said arms. When such engagement takes place the rod and the devices for moving said rod are held locked against movement and are not released until the wheels of the last car pass from the switch.

While I have illustrated the locking-bar in connection with a particular form of switch, it will be evident that the same may be used in connection with switching, signaling, and other devices when there are two movable parts or sections at a distance from each other and when one part should not be shifted until the last wheels of the last car have passed both sections. It will also be evident that the frog herein described may be used in connection with other constructions of switch.

What I claim is—

1. A frog consisting of a main rail-section bent at a point between its ends, and two other sections bolted upon opposite sides of the main section, substantially as described.

2. The combination with the separated connected movable frog and switch sections of a switch, of a movable bar extending between said sections and bearing against a rail of the side track in position to be moved out of contact therewith by the wheels of a train, means for maintaining the bar normally in contact with the rail, and parts connected with the movable switch-sections, and other parts extending from the bar in position to make contact when the bar is moved, substantially as described.

3. The combination with the separated connected movable frog and switch sections of a switch, of a movable bar between said sections and normally bearing upon a rail of the side track in position to be moved laterally out of contact therewith by the flanges of the wheels of a train, locking devices on the movable bar and parts connecting the switch-sections carrying locking devices adapted to interlock with those of the movable section when said section is moved away from the rail, substantially as described.

4. The combination with the movable sections of a switch, of a locking-bar normally bearing laterally upon one of the rail-sections and devices connected with the switch-sections and with the locking-bar for holding the sections against movement when the bar is moved away from the rail-section, substantially as described.

5. A movable frog consisting of a main rail-section and two removable or detachable sections secured at angles to said main section, substantially as described.

6. A movable frog consisting of a main rail-section provided with a flangeway extending across it and two other removable or detachable sections secured to said main section at angles thereto, substantially as described.

7. A movable frog consisting of a main rail-section and two other sections secured at angles to said main section, and filling-pieces interposed between the sections, substantially as described.

8. A movable frog consisting of a main rail-section bent at a point between its ends and having a flangeway extending across it at its bend in the direction assumed by one of its ends, and two other removable or detachable sections secured to the main rail-section upon opposite sides thereof, substantially as described.

In testimony whereof I have signed my name to this specification in the presence of two subscribing witnesses.

CHAS. B. PRICE.

Witnesses:
 M. A. CARMODY,
 W. A. HAMILTON.